July 4, 1950     J. C. BAXTER     2,513,780

NUT APPLYING DEVICE

Filed Nov. 4, 1946

INVENTOR
JOHN C. BAXTER
BY Liverance and
Van Antwerp
ATTORNEYS

Patented July 4, 1950

2,513,780

UNITED STATES PATENT OFFICE 2,513,780

NUT APPLYING DEVICE

John C. Baxter, Grand Rapids, Mich.

Application November 4, 1946, Serial No. 707,671

3 Claims. (Cl. 81—10)

The present invention relates to a very novel and effective nut applying and securing device.

The application of nuts to screw threaded bolts or studs in the manufacture of machines and machine elements is very prevalent, great numbers of the bolts and nuts being used for securing parts together. In the use of the machines, it is not only very desirable but essential that the nuts when once in place shall not loosen either partially or wholly from the screw threaded shanks on which they are mounted. Many and various types of nut locks have been used attempting to solve the problem presented but few if any are successful in their entirety of purpose and use and, of course, in many instances an additional part has to be used or in others the nut or bolt is of a special relatively expensive manufacture. In those cases where nuts are applied to the threads of a bolt and the turning of the nut thereon is slow and hard because of a dimensioning of the threads of the screw and the interior threads of the nut so they bind tightly against each other, this for the purpose of rendering any unturning of the nut hard, the time consumed in applying the nut is excessive and where large numbers of nuts are applied to bolts the labor cost is heavily increased.

With my invention a nut may be applied to a bolt freely and easily, being turned to the position at which it is tightly seated against the seat it is to reach and, thereafter, automatically the tool which I have provided and the process which is followed results in a spinning and upsetting of the nut at its outer end and a pressing of the metal inwardly into very snug tight and firm engagement with the threads of the bolt. The application of the nuts to the bolts in the operation of my invention is rapid and after the spinning operation described has been performed, the nut is securely held and in effect locked against reverse turning or unscrewing, at least may not be removed except upon the exertion of a heavy turning force. The connection of the nut to the bolt is made secure so that it will not, in the use and operation of the machine with which it is associated, accidentally or otherwise become loose or in extreme cases detach completely from the bolt upon which it has been placed.

My invention has for its primary object and purpose, a novel method of nut application and securing, and a novel tool for such purpose which is motor driven in its use, from the shaft of a small light weight motor having a handle for its manipulation.

An understanding of the invention may be had from the following description, taken in connection with the accompanying drawing, in which.

Figure 5:
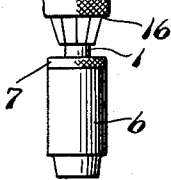
Figure 6:
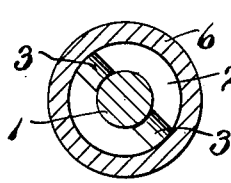
Figure 4:
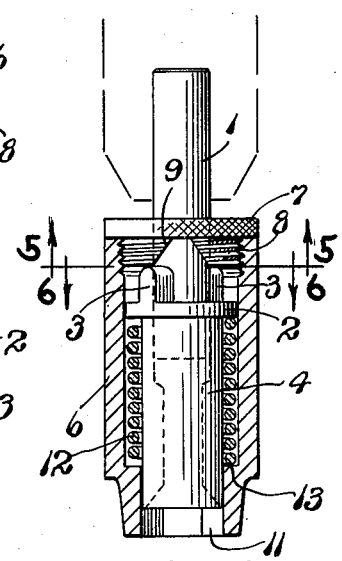
Fig. 4 is a similar vertical section illustrative of the automatic separation of the nut turning and spinning parts of the tool upon the nut being screwed onto the bolt and firmly pressed against the seat it is to engage.

Figs. 5 and 6 are horizontal sections upon the plane indicated by the lines 5—5 and 6—6 of Fig. 4, the sections being taken looking in opposite directions.

Figure 7:
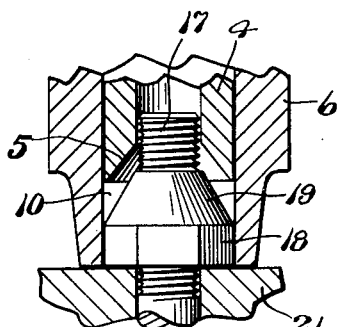

Fig. 7 is a fragmentary enlarged vertical section showing the position of the parts of the tool as occupied by them when the nut is being screwed onto the bolt stem.

Figure 8:
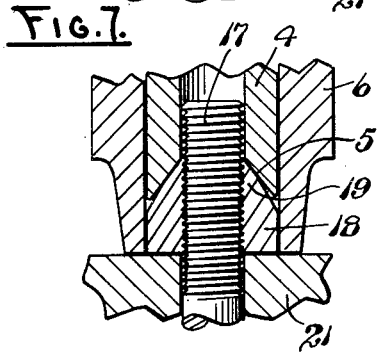
Figure 9:
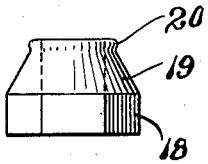

Fig. 8 is a similar sectional view illustrating the position of the parts when the outer end portion of the nut is spun and upset inwardly into tight engagement with the threaded bolt stem, and Fig. 9 is an elevation of a preferred form of nut to be used.

Like reference characters refer to like parts in the different figures of the drawing.

The nut turning and spinning unit of the nut applying device includes a cylindrical shaft 1 of short length which, as shown in the drawings, at its lower end is inserted to have a drive fit or one equivalent thereto in a spinning structural element of the device, passing through an annular disk 2 from which two upwardly extending diametrically opposed lugs 3 extend upwardly at opposite sides of the shaft 1; and integral with the disk 2 a sleeve 4 extends downward having an axial passage throughout its length into the upper end of which the lower end portion of the shaft 1 extends. The lower free end of the sleeve 4 is machined to provide an inner frusto-conical continuous surface 5 at the lower end of the axial passage through the sleeve. It is of course to be understood that the shaft 1 and the parts 2, 3 and 4 are to all purposes and effects the same as though integral, and if desired may in the first instance be made from an integral body of metal. The sleeve 4 always moves and turns with the shaft 1 whenever said shaft is driven.

Surrounding said sleeve 4, annular disk or flange 2 and the lower part of the shaft 1 is an outer sleeve 6 which at its upper end has a screw having a head 7 of disk-like form from which an exteriorly screw threaded stud 8 extends screwed into the sleeve 6, shaft 1 passing therethrough. Said threaded stud 8 at diametrically opposed points is cut away and recessed to provide two opposed recesses 9, the sides of which are angularly disposed with respect to the axis of the shaft 1. The sleeve 6 at its lower end portion is interiorly reduced in diameter, providing a short cylindrical zone 10 which forms a guide for the lower end of the sleeve 4. Below the zone 10 the lower end portion of the sleeve 6 is interiorly formed as a socket 11 shaped to engage with a nut. Nuts are ordinarily made from hexagonal stock and the socket 11 will usually be, correspondingly, of a complementary hexagonal form; but other shapes of nuts will have the socket at 11 shaped to correspond and engage therewith.

A strong coiled compression spring 12 surrounds the sleeve 4, at its upper end engaging against the annular disk or flange 2 and at its lower end against the annular shoulder 13 which is at the upper end of the guiding zone 10 described. The small electric motor 14 with its handle 15 at one end is a well known and conventional type of motor used with various kinds of small hand rotatable tools. The upper end of the shaft 1 is detachably connected with the driving shaft of the motor in a conventional manner by means of the manually operable chuck or collet used for such purposes illustrated at 16, not in itself new but well known in the art.

In the operation and use of the tool the threaded shank 17 of a bolt is to have a nut applied thereto. The nut preferably will have a hexagonal or other out-of-round end portion 18 from which a frusto-conical section 19 extends and which conical section at its outer end preferably will be provided with an annular rib 20. The thickness of the metal when the nut is screwed onto the stem 17 at the smaller end of the nut, will be small so that upon a spinning pressure applied against such conical end of the nut, or the annular rib thereon, the metal is upset and flows and is forced inwardly into very snug tight engagement with the screw threads of the bolt shank 17. The angle of the frusto-conical portion 19 of the nut and of the complementary seat at 5 varies a few degrees so that it is the outer end portion of the nut which is engaged by said seat 5 in the about to be described spinning operation.

Figure 1:
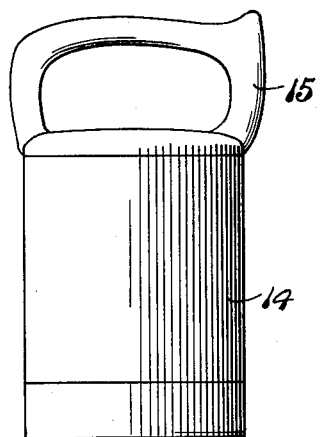
Fig. 1 is an elevation of the complete nut applying device of my invention.
Figure 2:
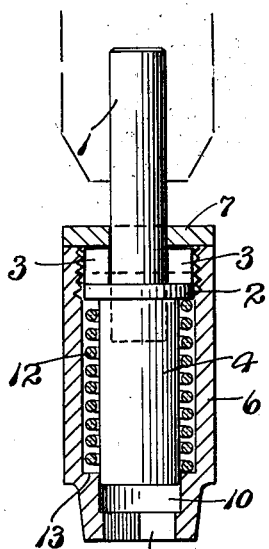
Fig. 2 is a longitudinal vertical section through the immediate nut applying device of my invention which is operatively connected with the nut to be driven by the motor, with the parts in the position which they occupy when the nut is being screwed onto the bolt.
Figure 3:
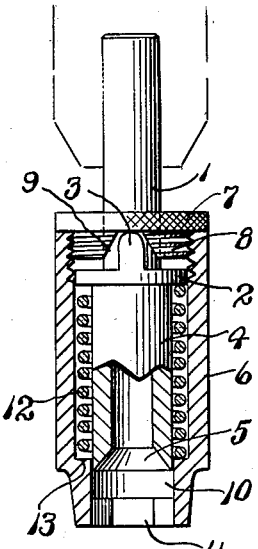
Fig. 3 is a longitudinal vertical section with the parts in the same position as in Fig. 2, the plane of the section being at right angles to that of Fig. 2.

The nut is inserted into the open end of the sleeve 6, its conical portion 19 first entering and the out-of-round portion 18 engaging with the socket 11. The spring 12 normally forces the parts into the position shown in Fig. 3 wherein the lugs 3 enter the recesses at 9. On operating the motor 14 by closing its control switch, shaft 1 is driven and through the clutch connection provided by the lugs 13 and the recesses 9, sleeve 6 is turned at the same speed as the shaft 1 and the nut is rapidly screwed to place or until it seats against the member 21 from which the threaded shank 17 of the bolt projects. Upon such seating there will be a resistance against further turning of the sleeve 6 which, when the nut is tightly seated, will cause the inclined sides of the recess 9 to ride upon the projecting ends of the lugs 3 moving the sleeve 6 outwardly relative to the interior sleeve 4 and disconnecting said sleeve, whereupon the outer sleeve 6 will remain connected with the nut 18 but be held from rotation, with the inner sleeve 4 continuing substantially at the same speed of rotation as before. Such disengagement of the lugs 3 from the recesses 9 is thereafter maintained by pressure on the handle 15 sufficient to compress spring 12. Thereupon the nut standing still and the conical seat at 5 bearing against the outer end of the nut and rib 20 thereon the metal of said rib and adjacent portions of the nut is subjected to a spinning action, causing the metal to flow and be pressed inwardly progressively from the outer end portion of the nut for a distance, or as shown in Fig. 8 and a very secure and tight, substantially locking engagement of the nut and bolt is obtained.

It is of course to be understood that the reference to the vertical position of the parts as shown in the drawings is for descriptive purposes and that the invention operates when the shaft 1 is located in a horizontal position, as it will be located in many applications of nuts to bolts; or in any of the other positions which may be taken by the axis of the shaft between horizontal and vertical which will, in no way, affect the operation.

The structure described and the method followed have proved very practical and useful. The structure is relatively simple in the number of parts, is easily manufactured and assembled at low cost. The applying of nuts and their effective locking in place after they have been freely turned to their seating positions is very effectively and rapidly accomplished with my invention.

Having thus described my invention what I desire to secure and claim as Letters Patent is as follows:

1. In a construction as described, a driven shaft, a spinning sleeve connected at one end of said shaft and driven therewith, said spinning sleeve at its free end having a frusto-conical recess, a second sleeve surrounding the spinning sleeve, releasable clutch connections between said shaft and second sleeve, yielding means for normally holding said clutch connections in operative engagement, said second sleeve at its end adjacent the free end of the spinning sleeve having a nut receiving socket, said clutch connections being separable for independent driving of the spinning sleeve with the second sleeve at rest upon application of force to overcome said yielding means.

2. A driven shaft, means for rotating said shaft continuously, a spinning or first sleeve connected to one end of said shaft and extending therefrom, said sleeve at its outer or one end having a frusto-conical recess therein, a second sleeve surrounding the spinning sleeve, an apertured screw plug, through which said shaft passes, screwed into the inner or one end of the second sleeve, said plug having a radial recess in the end which faces said first sleeve, lugs connected at the opposite end of said first mentioned sleeve receivable in said recesses in the plug, and yielding spring means around said first sleeve and within said second sleeve normally forcing said lugs into said recesses, said second sleeve at its opposite or outer end having a nut receiving socket disposed a short distance outwardly from the recessed end of said first sleeve.

3. A device as described comprising, a spinning member having an inwardly tapered opening at one end, means for positively rotating the spinning member, a sleeve surrounding the spinning member and having a nut receiving socket projecting beyond said end, a spring acting to thrust said sleeve on said spinning member toward said end, and a clutch acting between said sleeve and said spinning member under tension of said spring and disengageable by movement of the spinning member relative to the sleeve toward said end against action of said spring.

JOHN C. BAXTER.

REFERENCES CITED

The following references are of record in the file of this patent:

UNITED STATES PATENTS

| Number | Name | Date |
|---|---|---|
| 206,566 | Hemelright | July 30, 1878 |
| 348,426 | Shellenberger | Aug. 31, 1886 |
| 425,457 | Rayner | Apr. 15, 1890 |
| 444,721 | Bevington | Jan. 13, 1891 |
| 587,110 | Temple | July 27, 1897 |
| 1,754,178 | Muir | Apr. 8, 1930 |
| 1,885,986 | Butler | Nov. 1, 1932 |
| 1,925,714 | Crist | Sept. 5, 1933 |
| 2,325,522 | Lauer et al. | July 27, 1943 |
| 2,332,935 | Schlack | Oct. 26, 1943 |

FOREIGN PATENTS

| Number | Country | Date |
|---|---|---|
| 473,280 | Germany | Mar. 13, 1929 |
| 544,265 | Great Britain | Apr. 3, 1942 |